Nov. 13, 1945.     E. J. DILLMAN     2,389,111
CONTROL MEANS
Filed Feb. 17, 1943     2 Sheets-Sheet 1

INVENTOR
Earnest J. Dillman
BY Andrew K. Foulds
his ATTORNEY

Nov. 13, 1945.  E. J. DILLMAN  2,389,111
CONTROL MEANS
Filed Feb. 17, 1943  2 Sheets-Sheet 2
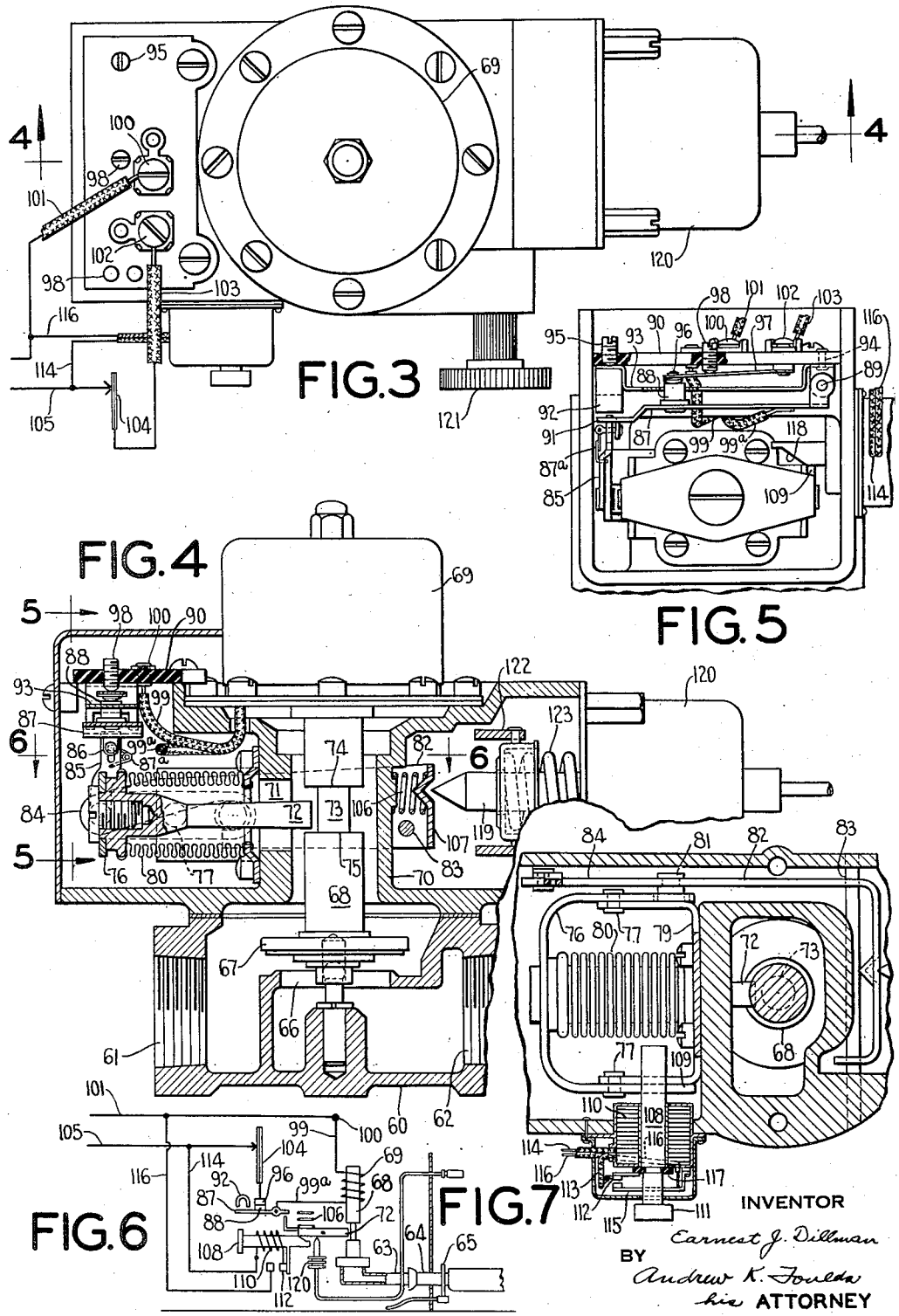
INVENTOR
Earnest J. Dillman
BY Andrew K. Foulds
his ATTORNEY Patented Nov. 13, 1945

2,389,111

UNITED STATES PATENT OFFICE 2,389,111

CONTROL MEANS

Earnest J. Dillman, Detroit, Mich., assignor to Detroit Lubricator Company, Detroit, Mich., a corporation of Michigan Application February 17, 1943, Serial No. 476,134

20 Claims. (Cl. 236—1)

This invention relates to new and useful improvements in heating apparatus and more particularly to a valve for controlling the flow of fuel to the apparatus.

An object of the invention is to provide safety means for moving the valve to closed position in the event of failure of the automatically operating means to function.

Another object is to provide manual means for moving an electrically operated valve to open position upon failure of the current supply.

Another object is to provide automatically actuated means for moving the valve to open and closed position during the time of failure of current supply.

Another object is to provide safety means responsive to a condition of the apparatus to close an electrically operated valve and operable when the valve has been manually opened subsequent to current failure to close the valve upon the occurrence of a lower than maximum condition.

The invention consists in the improved construction and combination of parts to be more fully described hereinafter and the novelty of which will be particularly pointed out and distinctly claimed.

In the accompanying drawings to be taken as a part of this specification, there are fully and clearly illustrated several preferred embodiments of the invention, in which drawings:

Fig. 3 is a top plan view of another form of control valve and diagrammatically illustrating its connection to a control switch;

Fig. 4 is a view of the valve in section on the line 4—4 of Fig. 3;

Fig. 5 is a detail end view of the valve looking in the direction of the arrows 5—5 of Fig. 4;

Fig. 6 is a detail plan view in section on the line 6—6 of Fig. 4, and

Fig. 7 is a schematic view showing the wiring diagram and the cooperative relation of parts of the valve of Fig. 3.

Figure 1:
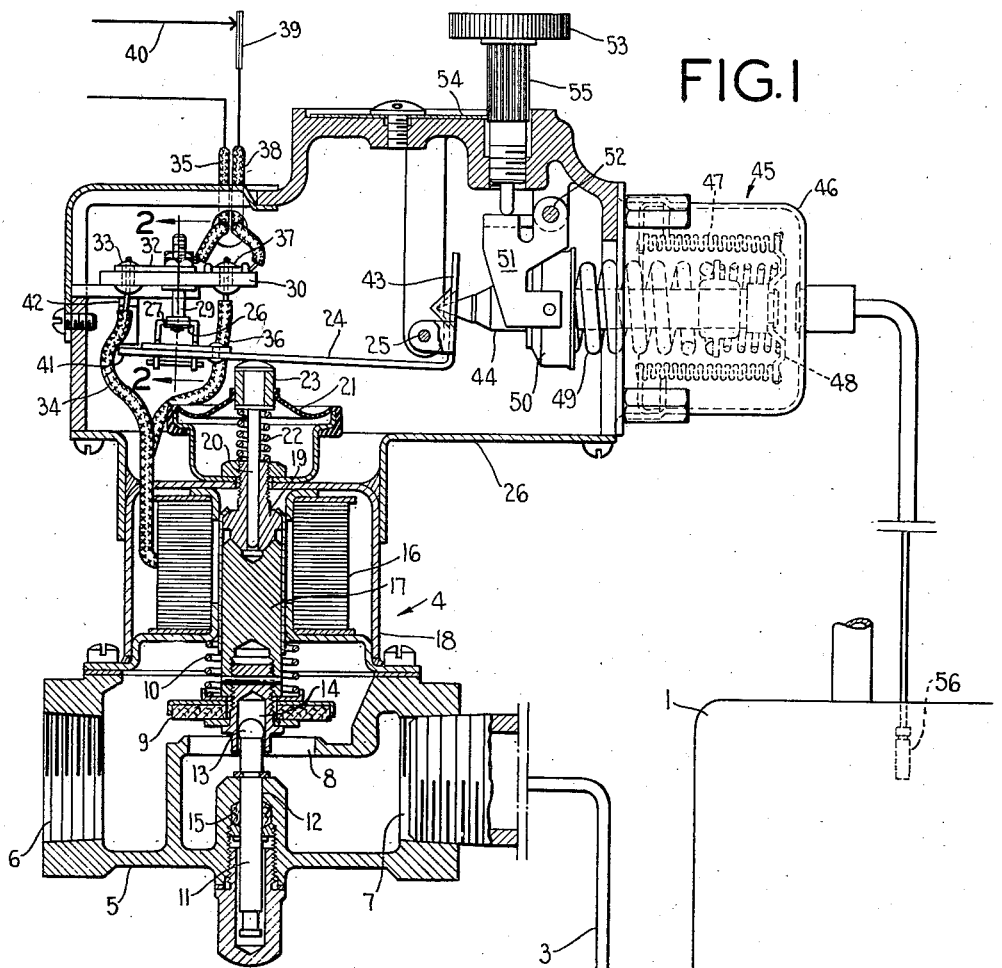
Figure 1 is a view of a heating apparatus or system showing the valve of this invention in central section.
Figure 2:
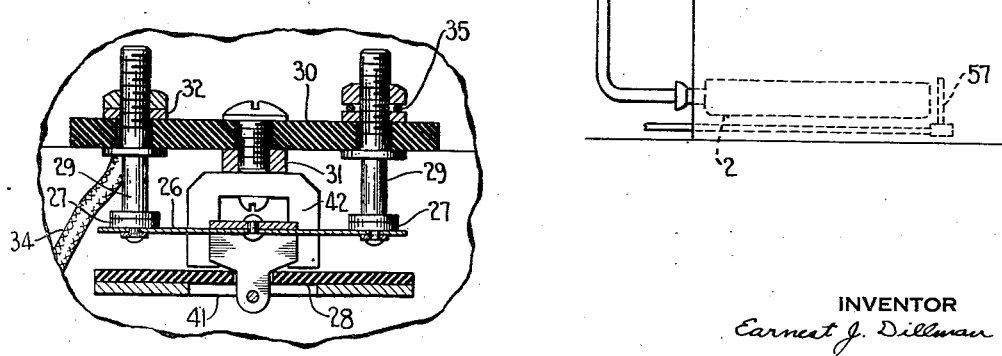
Fig. 2 is an enlarged detail view of a control switch and taken on the line 2—2 of Fig. 1.

Referring to Figures 1 and 2, the reference character 1 designates a heating apparatus such as a boiler or furnace having a fluid fuel burner 2 for gas which is fed through a supply pipe 3 from the control valve 4. The casing or body 5 of the valve has an inlet 6 for connection to a source of gas supply and an outlet 7 connected to the supply pipe 3. Flow through the valve port 8 is controlled by a valve member 9 which is urged toward closed position by a helical coil compression spring 10. A combined guide member and manually operable valve opening member 11 is reciprocally supported in the wall of the casing 5, as at 12 in longitudinal axial alignment with the valve member 9. The inner end portion 13 of the member 12 slidably fits within a cylindrical recess or guideway 14 in the valve member 9 and is engageable on upward or inward movement with the end or bottom wall of the recess to move the valve toward open position against the force of the spring 10. The member 11 is sealed to the casing by packing material 15 which also serves as a friction member to hold the valve opening member 11 in inward valve opening position.

The valve member 9 is movable to open position by electrically operable means 16, such as a solenoid coil having an armature 17 formed by the upper portion of the stem of the valve member 9. Alined with the armature 17, the casing 18 for the coil has an aperture in which is positioned a guide member 19. Longitudinally reciprocal in a central guide bore through the member 19 and alined with the armature 17, there is a force transmitting thrust member 20 which is sealed to the casing 18 around the aperture for guide member 19 by a flexible closure member 21. The thrust member 20 is urged in upward or outward direction and to inactive position out of engageable contact with the armature 17 by a helical coil spring 22, which is positioned under compression between the guide member 19 and a head or end member 23 on the thrust member 20. The spring 22 urges the end member 23 upward or outward into engagement with the underside of a lever member 24 which is tensioned or stressed in an upward direction by the spring. The lever member 24 is pivotally supported on a shaft 25 supported by the opposite walls of a casing 26 carried by the casing 18. On the opposite side of the end member 23 from the lever fulcrum or shaft 25, the lever member 24 carries a switch member 26 carrying a pair of contacts 27 which are electrically connected together and insulated from the lever 24 by a plate or pad of electric insulating material 28. The contacts 27 cooperate with a fixed switch member having spaced contacts 29 carried by a pad or plate 30 of electric insulating material and mounted on arm 31 projecting from the wall of casing 26. One of the contacts 29 is connected by an electric plate 32 to a terminal 33 from which a lead wire 34 connects to one end of the coil 16. The other contact 29 is connected by a lead wire 35 to a source of current supply. The other end of the coil 16 is connected by a lead wire 36 to a terminal 37 mounted on the plate 30 and from which a lead wire 38 extends to a main control switch 39, such as a room thermostat or the like from which a lead wire 40 connects to the source of current supply. The end portion of lever member 24 which extends beyond the switch member 26 provides an armature 41 cooperable with a permanent magnet 42 secured to and extending downward from the arm 26. The spring 22 serves to hold the contacts 27 in engagement with the contacts 29, the armature 41 being spaced by an air gap from the magnet 42 when the contacts are in engagement.

The lever member 24 is preferably of bell crank form having an end portion 43 on the opposite side of the fulcrum 25 from the switch member 26 and which is engageable by the thrust member 44 of a safety limit means 45 which is shown as a fluid pressure operated device having a casing 46 closed by a pressure responsive element 47 such as a metal bellows responsive to fluid pressure within the casing 46 and having its head or end wall 48 engaging the thrust member 44. The maximum desired operating pressure acting on the element 47 which will move the lever member 24 against the force of the magnet 42 and spring 22 is determined by the adjustable resisting spring 49 which acts against the end wall 48 and is held under compression by an adjustable follower member 50 supported by a bifurcated lever 51 journaled on a shaft 52 carried by the casing 26. A hand adjustment member 53 is screw-threaded through the wall of the casing 26 and has abutting engagement with the member 51. A dial 54 having a toothed edge cooperable with a pinion 55 on the member 53 may be provided to indicate the maximum operating pressure or safety limit for which the device 45 is set to operate. The device 45 may respond directly to the pressure of the fluid heated by the apparatus 1 or may be the power element of a liquid or fluid thermostat having a bulb element 56 to be positioned in the fluid containing space of the heating apparatus 1. The operation of the apparatus of Figs. 1 and 2 is as follows: As shown, the thermostat 39 is in closed position calling for heat and therefore, since the switch members 27 and 29 are in closed position, the coil 16 has been energized and is holding the valve member 9 in open position to supply gas to the burner 2. When the thermostat 39 is satisfied and breaks circuit, the coil 16 will be deenergized and the valve member 9 will close by gravity and the force of spring 10. If, for any reason, such as a failure of the valve 9 to close or of the switch or thermostat 39 to open, the fluid pressure acting on the element 47 reaches the maximum desired safe pressure limit, then the thrust member 44 will move outward or to the left facing Fig. 1 to rotate the lever member 24 downward about its shaft 25. When the maximum operating pressure is reached, the force of the device 45 on the lever member 24 will be sufficient to overcome the magnet 42 and the spring 22 so that the lever member 24 will be initially moved with a quick action to break the circuit of the coil 16 at the contacts 29. Deenergization of the coil 16 will normally result in the valve member 9 moving to closed position but if for any reason the valve member 9 should stick open or fail to close, then the lever member 24 in its downward movement subsequent to breaking of circuit at contacts 29 will move the thrust member 20 into engagement with the armature 17 and force the valve member 9 to its seat to close the valve port 8. When the temperature or pressure in the apparatus 1 decreases due to the closure of valve member 9, the spring 22 will move the switch lever member 24 upward and engage the contacts 27 with the contacts 29, thereby reenergizing the coil 16, which, if the thermostat is still calling for heat and in closed position, will act on the armature 17 to open the valve. Some form of ignition, such as a pilot burner, 57 will of course be provided for reignition of the burner 2.

Referring to Figs. 3 to 7 inclusive, the control valve has a body or casing 60 with an inlet 61 for connection to a source of fluid fuel such as gas and an outlet 62 for connection to a supply pipe 63 for feeding the burner 64 of a heating apparatus, such as in Fig. 1, a pilot burner 65 or the like being provided for igniting the burner 64. The valve port 66 is controlled by a valve member 67 having a stem 68 with its upper end portion, the upper portion of which provides an armature cooperable with an electrically operable means 69, such as a solenoid coil for actuating the valve 67. In this form the weight of the stem and armature serves as a means for urging the valve member toward closed position. Through the side wall of the casing portion 70 which surrounds the valve stem and armature there is an aperture 71 through which a pivoted thrust member or lever 72 extends. The stem 68 has a reduced diameter portion 73 providing upper and lower shoulders or abutments 74, 75 between which the inner end portion of the thrust member 72 is positioned. The spacing between the abutment 74 and 75 is such that with the member 72 in its normal inactive position as shown, the abutment 75, when the valve member 67 is open, will be just out of engagement with the member 72 and so that the valve member will be free to seat and close the port 66 without engaging the abutment 74 with the member 72, even though there may be wear of the valve member but so that the abutment 74 is substantially in contact with the member 72.

The member 72 has a yoke 76 which is pivotally supported at opposite points, as at 77, on a U-shaped bracket 79 secured to the casing portion 70. The aperture 71 is closed and sealed by a flexible member 80 such as a metal bellows which is secured and sealed at one end to the yoke 76 and at its other end is secured and sealed to the casing portion 70.

One of the arms of the thrust member yoke 76 is connected by a pin and slot engagement 81 to a lever 82 which is journaled on a shaft 83 extending between the walls of the casing. The lever 82 has an end portion 84 extending on the opposite side of its connection 81 from the fulcrum or shaft 83. Pivotally connected to the free end of the lever portion 84 there is an upwardly extending link 85 having a lost motion pin and slot engagement, as at 86, with a switch arm 87. The lost motion at the pin and slot engagement 86 is taken up by a spring 87$^a$ which normally tends to separate the link 85 and switch arm 87 and has sufficient resilience to move the switch arm upward with upward movement of the link 85. A contact 88 is mounted on the arm 87 which is pivotally supported, as at 89, on the underside of a supporting plate 90 of electric insulating material. The end portion 91 of the switch lever 87 forms an armature cooperable with a permanent magnet 92 carried by a resilient supporting arm 93 fixed to the plate 90, as at 94, so that it is in overlying relation to the switch arm 87. The arm 93 is adjustable by means of a screw 95 threaded through the plate 90, in order to regulate the air gap between the magnet 92 and the armature 91 when the switch is closed. The contact 88 is cooperable with a fixed contact 96 mounted on the plate 90 by means of a spring blade 97 which is backed by an adjustment screw 98. One end of the coil 69 is connected by a lead wire 99 to a terminal post 100 from which a lead wire 101 extends to a source of current supply. The other end of the coil 69 is connected by a lead wire 99a to the supporting arm 87 of contact 88. The contact 96 is connected through the blade 97 to a terminal post 102, from which a lead wire 103 connects to a main control switch or thermostat 104, from which a a lead wire 105 extends to the source of current supply to complete the circuit.

The lever 82 is tensioned and urged in an upward direction by a helical coil spring 106 held under compression between the casing portion 70 and a lateral arm 107 on the opposite side of the fulcrum shaft 83 from the pivotal connection 81. Upward movement of the thrust member 72 under the force of spring 106 is prevented by a manually releasable member 108, see Fig. 6, which is carried by the casing wall and extends into overlying engagement with the other arm 109 of the thrust member yoke 76. The member 108 forms the armature or plunger of a solenoid 110 which is secured to the casing wall and supported in an aperture therethrough. A plunger 108 has a hand grip member 111 and carries a switch contact 112 connected by a lead wire 113 to one end of the coil 110. The other end of the coil 110 is connected by a lead wire 114 to the lead wire 105. Supported by the casing of coil 110 there is a resilient supporting arm or spring blade 115 having a contact normally spaced from but closely adjacent to the contact 112 and engageable thereby upon initial releasing or retracting movement of the plunger 108. The arm 115 is connected by a lead wire 116 to the lead wire 101. A stop member 117 limits inward movement of the plunger 108 and may be of electrical insulating material and carry the switch contact 112. The inner end of the plunger 108 is provided with a cam surface 118 which inclines upwardly and inward and is cooperable with the arm 109 to return the arm and thrust member 72 to the position shown upon inward movement of the plunger 108 when the coil 110 is energized.

Supported by the wall of the valve casing there is a safety limit means having a plunger or thrust member 119 operable by a fluid pressure operated device 120, such as the device 45 of Fig. 1. An adjustment screw 121, see Fig. 3, cooperates with a bell crank member 122 similar to the arrangement in Fig. 1 and acts therethrough to adjustably compress a helical coil spring 123 opposing movement of the thrust member 119 by the device 120. The operating end of the member 119 terminates short of the lever arm 107 when the thrust member 72 is held in normal position by the solenoid plunger 108, so that when the arm 109 is released by retraction of the plunger 108, the arm 107 can have movement toward the thrust member 119, with the result that the member 119 will transmit movement to the thrust member 72 at a lower fluid pressure and therefore a lesser degree of movement of the member 119.

The operation of the control valve of Figs. 3 to 7 is as follows. When the thermostat 104 moves to closed position and calls for heat as shown in Fig. 3, the coil 69 will be energized, since the switch contacts 88 and 96 are in engagement and the valve member 67 will be moved to open position as shown in Fig. 4. When the desired maximum safety limit temperature or pressure of the heating apparatus is reached at which the device 120 is adjusted by spring 123 to operate, the lost motion between thrust member 119 and the lever arm 107 will have been taken up. This maximum pressure or temperature will be sufficient to overcome the force of the magnet 92 so that the lever 82 will be moved downward with a quick action, thereby to open the switch operating contact 88 from the contact 96 to break the circuit of coil 69. Substantially simultaneously but subsequent to opening of the switch, the thrust member 72 will move downward so that if the valve member 69 has failed to move to its seat for any reason, the member 72 will engage the abutment 75 and force the valve member 67 downward to its seat to close the port 66. Upon reduction of pressure in the device 120, the spring 123 will withdraw the thrust member 119, thereby permitting the spring 106 to move the lever 82 and its link 85 upward to reengage the contact 88 with the contact 96, thereby again completing the circuit of the valve operating coil 69.

If the current supply for the coil 69 should fail so that the valve member 67 closed and it was desired to operate the heating apparatus, then the plunger 108 will be withdrawn by the hand grip member 111. As soon as the cam surface 118 has been withdrawn sufficiently, the arm 109 will move upward under the force of spring 106 and carry with it the thrust member 72, which will engage the abutment 74 and move the valve to open position. Release of the thrust member 72 by withdrawing plunger 108 acted to close switch contacts 112 with blade 115, so that the coil 110 can be energized upon resumption of the current supply. The clockwise rotation of lever 82 by the spring 106 as the valve was lifted to open position, acted to move the lever arm 107 toward the thrust member 119. Accordingly, the temperature or pressure of the heating apparatus at which the thrust member 119 will cause counterclockwise rotation of the lever 82 and downward movement of the thrust member 72 will be at a lower degree than the maximum for which the spring 123 has been adjusted. Closure of the valve at a temperature below the maximum limit temperature is desirable under these conditions because the thermostat 104 is no longer in control, due to failure of the current supply and therefore the heat supplied by the apparatus 1 will be dependent solely upon the control of the device 120. Should the valve member 67 fail to close upon downward movement of the thrust member 72 while the thrust member 108 is retracted, then upon increase of temperature or pressure to the maximum operating limit for which the spring 123 is adjusted will cause the thrust member 72 to move downward into engagement with the lower abutment 75 and positively move the valve to its seat to close the port 66. Assuming that the valve member 67 has closed by gravity at the lower temperature operation of the device 120 and therefore switch contacts 88, 96 remain closed, the resumption of current supply will immediately energize the resetting coil 110 to pull the plunger 108 inward and force the thrust member 72 to its normal inactive position by means of the cam surface 118 engaging the arm 109. Inward movement of the plunger 108 will, at the end of its travel, separate the contact 112 from arm 115, thereby breaking the circuit of the coil 110. By reason of using the switch 112, 115, a heavy coil of high power can be used for operating the plunger 108.

What is claimed and is desired to be secured by Letters Patent of the United States is:

1. A control device comprising a valve urged toward closed position, electrically operable means to move said valve toward open position, a switch controlling the circuit of said means, means operable to move said valve toward closed position and means operable on said switch by said last-named means and having lost motion connection to said valve so that said switch is opened prior to movement of said valve.

2. A control device comprising a valve, means urging said valve toward closed position, electrically operable means to move said valve toward open position, a switch controlling the circuit of said electrically operable means, and fluid pressure operated means operable at a predetermined pressure first to open said switch and then substantially simultaneously to move to engage and move said valve toward closed position upon failure of said urging means.

3. A control device comprising a valve, means urging said valve toward closed position, electrically operable means to move said valve toward open position, a switch controlling the circuit of said means, quickly acting means operable first to open said switch and then to engage and move said valve toward closed position upon failure of said urging means, and automatic means operable to actuate said acting means.

4. A control device comprising a valve urged toward closed position, electrically operable means to move said valve toward open position, a switch controlling the circuit of said means, lever means operable first to open said switch and then to move to engage and move said valve toward closed position, a magnet resisting initial valve closing operation of said lever means, and automatic means operable to move said lever means in opposition to the force of said magnet.

5. A control device comprising a solenoid valve having an armature, a switch controlling the circuit of said valve, a lever having operative connection with said switch and operable upon initial movement to open said switch to deenergize said valve, a thrust member operable by said lever and engageable with said armature, and means to move said lever to open said switch first and then upon failure of said valve to close, thereupon to engage said thrust member with said armature.

6. A control device comprising a solenoid valve having an armature, a casing for said valve and having an aperture registering with said armature, a switch controlling the circuit of said valve, a lever having operative connection with said switch, a thrust member operable by said lever and extending through said aperture for engagement with said armature, flexible means sealed to said thrust member and to said casing to close said aperture, and means to move said lever to open first said switch and then to engage said thrust member with said armature.

7. A control device comprising a solenoid valve having an armature, a thrust member reciprocal longitudinally of and engageable with said armature, a lever engaging said thrust member, a moveable switch member controlling the circuit of said solenoid valve and operable by said lever, a fixed switch member engageable by said moveable switch member, a spring acting on said thrust member and holding said thrust member against said lever and said switch members in engagement, a magnet cooperable with said lever and opposing separation of said switch members, and a thermostat operable to move said lever.

8. A control device comprising a solenoid valve having an armature, the casing for said valve having an aperture registering with said armature, a switch controlling the circuit of said valve, a lever having a fulcrum, a second lever having a fulcrum and pivotally connected to said first-named lever between said fulcrums, means operatively connecting said switch to said first-named lever on the opposite side of said first-named lever fulcrum from said pivotal connection, a thrust member secured to said second lever on the opposite side of its fulcrum from said pivotal connection and extending through said aperture for valve closing engagement with said armature, a bellows member sealed to said thrust member and to said casing around said aperture, and means operable to move said first-named lever to open said switch and to engage said thrust member with said armature.

9. A control device comprising a valve urged toward closed position, electrically operable means to move said valve toward open position, means tensioned to move said valve toward open position, releasable means holding said tensioned means against valve opening movement, and automatic means operable to overcome the force of said tensioned means when said tensioned means has been released thereby to permit movement of said valve toward closed position.

10. A control device comprising a valve urged toward closed position, electrically operable means to move said valve toward open position, means tensioned to move said valve toward open position, releasable means holding said tensioned means against valve opening movement, a solenoid cooperable with said releasable means to return said releasable means to holding relation with said tensioned means, and automatic means operable to overcome the force of said tensioned means when said tensioned means has been released thereby to permit movement of said valve toward closed position.

11. A control device comprising a valve urged toward closed position, electrically operable means to move said valve toward open position, means tensioned to move said valve toward open position, releasable means holding said tensioned means against valve opening movement, a solenoid cooperable with said releasable means to return said releasable means to holding relation with said tensioned means, a normally open switch controlling the circuit of said solenoid and closed upon the releasing operation of said releasable means, and automatic means operable to overcome the force of said tensioned means when said tensioned means has been released thereby to permit movement of said valve toward closed position.

12. A control device comprising a valve having a stem and urged toward closed position, a reciprocal thrust member engageable with said stem on movement in one direction to move said valve toward open position and engageable with said stem on movement in the opposite direction to move said valve toward closed position, electrically operable means for moving said valve toward open position, said thrust member having a lost-motion connection with said stem so that said electrically operable means is free to move said valve, means tensioned to move said thrust member in valve opening direction, a switch controlling the circuit of said electrically operable means, means operable to open said switch upon movement of said thrust member in valve closing direction, releasable means holding said thrust member against movement by said tensioned means, and fluid pressure operated means operable to overcome the force of said tensioned means and move said thrust member.

13. A control device comprising a valve urged toward closed position, and having a stem, spaced upper and lower abutments on said stem, a thrust member engageable with said upper abutment to move said valve from a closed position toward and to hold said valve in an open position, said thrust member being engageable with said lower abutment to move said valve from an open position toward and to hold said valve in a closed position, electrically operable means cooperable with said stem to move said valve to an open position, a switch controlling the circuit of said electrically operable means, safety limit means operable at a predetermined fluid pressure to open said switch and to move said thrust member into moving engagement with said lower abutment, means tending to move said thrust member into engagement with said upper abutment, releasable means holding said tending means against operation, said limit means acting at a fluid pressure below said predetermined pressure to move said thrust member in valve closing direction when said releasable means has been released from holding relation with said tending means.

14. A control device comprising a valve, electrically operable means controlling opening and closing movement of said valve, valve operating means having a lost-motion connection with said valve so that said valve is movable relative to said electrically operable means by said operating means, said operating means being operable to move said valve from a closed toward an open position and being operable to move said valve from an open toward a closed position, releasable means holding said operating means against movement to move said valve in an opening direction, means tending to move said operating means in a valve opening direction and holding said operating means against said releasable means, and safety limit means operable on movement to move into engagement with and to operate said operating means in a valve closing direction, said operating means moving toward said limit means upon release of said releasable means so that the extent of movement of said limit means to operate said operating means is reduced.

15. A control device comprising a valve, electrically operable means controlling opening and closing movement of said valve, valve operating means having a lost-motion connection with said valve so that said valve is movable relative to said electrically operable means by said operating means, said operating means being operable to move said valve from a closed toward an open position and being operable to move said valve from an open toward a closed position, releasable means holding said operating means against movement to move said valve in an opening direction, means tending to move said operating means in a valve opening direction and holding said operating means against said releasable means, safety limit means operable on movement to move into engagement with and to operate said operating means in a valve closing direction, a switch controlling the circuit of said electrically operable means, and means interconnecting said operating means and said switch such that upon movement of said operating means by said limit means when said operating means is held by said releasable means, said switch will be opened for movement of said valve by said operating means, said operating means moving toward said limit means upon release of said releasable means so that the extent of movement of said limit means to operate said operating means is reduced.

16. A control device for a heating apparatus comprising a solenoid valve for controlling flow of fuel to the apparatus, a normally closed circuit breaking switch in circuit with said valve, safety limit means operable upon the occurrence of a maximum desired condition of the apparatus to open said circuit breaking switch, means initially spaced from and operable by said limit means to close said valve upon failure of said valve to close when said circuit breaking switch is opened, and means to actuate said last-named means to move said valve to an open position upon current failure and simultaneously to move said last-named means toward said limit means so that said limit means will actuate said last-named means to close said valve upon the occurrence of a lower than maximum condition.

17. A control device for a heating apparatus comprising a solenoid valve for controlling flow of fuel to the apparatus, a normally closed circuit breaking switch in circuit with said valve, safety limit means operable upon the occurrence of a maximum desired condition of the apparatus to open said circuit breaking switch, means initially spaced from and operable by said limit means to close said valve upon failure of said valve to close when said circuit breaking switch is opened, means to actuate said last-named means to move said valve to an open position upon current failure and simultaneously to move said last-named means toward said limit means so that said limit means will actuate said last-named means to close said valve upon the occurrence of a lower than maximum condition, electrically operable means effective to overcome said actuating means and to return said spaced means to initial position, a normally open switch closed upon movement of said spaced means toward said limit means, and means to open said last-named switch upon return of said spaced means to initial position.

18. A control device comprising a valve member urged toward closed position, a solenoid cooperable with said valve member and operable when energized to hold said valve member electrically in open position and to oppose movement of said valve member toward closed position, and safety means functioning initially to deenergize said solenoid and then upon failure of said valve member to move to closed position, to engage and move said valve member toward closed position.

19. A control device comprising a valve casing, a valve member in said casing and controlling flow therethrough, a solenoid coil mounted rigidly on said casing, an armature secured to said valve member and projecting into said coil, said armature tending by its weight to move said valve member to closed position, said coil when energized holding said valve member in open position, a switch having a movable contact member and controlling the circuit of said coil, a lever operable to move said contact member to make and to break the circuit of said coil, a thrust member operable by said lever to move said valve member to closed position upon opening of said switch by said lever, a spring under stress and acting to hold said lever in switch closing position and said thrust member against valve closing movement, an automatically acting power element engageable with said lever and operable to move said lever against the force of said spring for opening of said switch and closing of said valve member, and a magnet cooperable with said lever and opposing operation of said lever by said power element so that said lever will upon operative movement by said power element have a quick movement first to open said switch and then to operate said thrust member for valve member closing movement.

20. A control device comprising a valve casing having a valve port, a valve member reciprocal to and from said port to control flow through said casing, an armature secured to said valve and extending therefrom concentric with said port, a solenoid coil rigidly mounted on said casing and surrounding said armature, an abutment member engageable by said armature to limit opening movement of said valve member and having a guideway therethrough alined with said armature, a thrust rod reciprocal in said guideway, a lever engaging said rod and operable to move said rod into engagement with said armature to move said valve member to closed position, a switch controlling the circuit of said coil and having a movable contact member, means securing said contact member to said lever, a spring under stress and acting through said rod to hold said rod out of engagement with said armature and in engagement with said lever, said spring acting through said lever to hold said contact member in switch closing position, a magnet acting on said lever and opposing operation of said lever to open said switch and to move said rod, and a fluid pressure actuated power element engageable with said lever and operable to overcome the force of said magnet and the resistance of said spring, the force of said magnet being so related to the resistance of said spring that said lever is moved with a quick action by said power element.

EARNEST J. DILLMAN.